(12) United States Patent
Matikainen

(10) Patent No.: US 11,076,076 B2
(45) Date of Patent: Jul. 27, 2021

(54) LENS MODULE

(71) Applicant: AAC Optics Solutions Pte. Ltd., Singapore (SG)

(72) Inventor: Jarno Matikainen, Finland (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/726,186

(22) Filed: Dec. 23, 2019

(65) Prior Publication Data
US 2020/0412919 A1    Dec. 31, 2020

(30) Foreign Application Priority Data

Jun. 28, 2019   (CN) .......................... 201910578350.9

(51) Int. Cl.
| | | |
|---|---|---|
| *H04N 5/225* | (2006.01) | |
| *H04N 7/18* | (2006.01) | |
| *G03B 15/03* | (2021.01) | |
| *G03B 17/12* | (2021.01) | |
| *G02B 25/02* | (2006.01) | |
| *G02B 13/00* | (2006.01) | |
| *G03B 11/04* | (2021.01) | |

(52) U.S. Cl.
CPC ........... *H04N 5/2254* (2013.01); *G03B 17/12* (2013.01); *H04N 5/2256* (2013.01); *G03B 11/043* (2013.01)

(58) Field of Classification Search
CPC ...... H04N 5/2254; H04N 5/2256; H04N 7/18; G03B 17/12; G03B 11/043; G03B 15/03; G02B 7/021; G02B 7/04; G02B 25/02; G02B 13/008

USPC .... 348/335, 33, 164, 68, 374; 362/612, 555; 396/74, 79, 448, 529, 530, 28, 106; 359/611, 704, 826, 390, 475

See application file for complete search history.

(56) References Cited

U.S. PATENT DOCUMENTS

| | | | | |
|---|---|---|---|---|
| 8,576,333 | B2* | 11/2013 | Hsu .................. | H04N 5/225 348/374 |
| 10,591,648 | B2* | 3/2020 | Ramones ........... | H04N 5/33 |
| 10,816,760 | B2* | 10/2020 | Cho .................. | H04N 5/2254 |
| 2005/0146641 | A1* | 7/2005 | Cheng ............... | H04N 5/225 348/373 |
| 2006/0192854 | A1* | 8/2006 | Perlman ............. | H04N 7/18 348/159 |
| 2006/0251408 | A1* | 11/2006 | Konno ............... | G03B 41/00 396/14 |
| 2008/0309765 | A1* | 12/2008 | Dayan ................ | H04N 7/18 348/158 |
| 2010/0039253 | A1* | 2/2010 | Zhang ............... | G08B 1/08 340/539.1 |

(Continued)

*Primary Examiner* — Marly S Camargo
(74) *Attorney, Agent, or Firm* — W&G Law Group LLP

(57) ABSTRACT

The present disclosure relates to the field of lens technologies and provides a lens module. The lens module includes: a lens assembly including a lens barrel and a set of lenses received in the lens barrel; and an illumination assembly fixed to the lens assembly, the illumination assembly including an illumination holder surrounding and fixed to the lens barrel and an illumination window arranged on the illumination holder. The illumination window has an annular shape and surrounds the lens assembly. The present disclosure can solve a problem in the related art that the camera and the illumination assembly are separate components, which would otherwise occupy a space.

17 Claims, 6 Drawing Sheets

(56) References Cited

U.S. PATENT DOCUMENTS

| | | | |
|---|---|---|---|
| 2012/0039593 A1* | 2/2012 | Yang | G03B 15/05 |
| | | | 396/175 |
| 2012/0092549 A1* | 4/2012 | Hsu | H04N 5/225 |
| | | | 348/374 |
| 2013/0169814 A1* | 7/2013 | Liu | H04N 7/183 |
| | | | 348/151 |
| 2016/0241788 A1* | 8/2016 | Moriya | H04N 5/232 |
| | | | 348/208.99 |
| 2020/0252525 A1* | 8/2020 | Nunnink | H04N 5/225 |
| 2020/0364575 A1* | 11/2020 | Griffin | G06N 30/082 |

* cited by examiner

A—A

LENS MODULE

TECHNICAL FIELD

The present disclosure relates to the technical field of lens technologies, and in particular, to a lens module.

BACKGROUND

As an image input device, a camera has been widely used in fields of digital products, such as cellphones, computers, toys, industrial detection, automotive car cameras and medical and health care.

In order to meet an imaging requirement, the camera is usually provided with an illumination assembly. In the related art, since the camera and the illumination assembly are separate components and are individually assembled, the large space may be occupied, which limits a screen occupation ratio of an electronic device.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

1—illumination holder;
11—first end surface;
111—first recess;
12—second end surface;
121—second recess;
121*a*—first recessed portion;
121*b*—second recessed portion;
121*c*—step surface;
121*d*—first seal;
1211—silica membrane;
1212—adhesive;
13—step portion;
131—camera window;
132—second seal;
14—blocking portion;
15—connection portion;
151—through hole;
2—illumination assembly;
21—illumination window;
22—flexible substrate;
23—LED light;
3—lens barrel;
31—third seal;
4—motor;
5—circuit board;
51—light sensitive chip;
52—cover plate;
521—light through hole;
6—module cover.

DESCRIPTION OF EMBODIMENTS

The present disclosure will be further illustrated with reference to the accompanying drawings and the embodiments.

Figure 1:
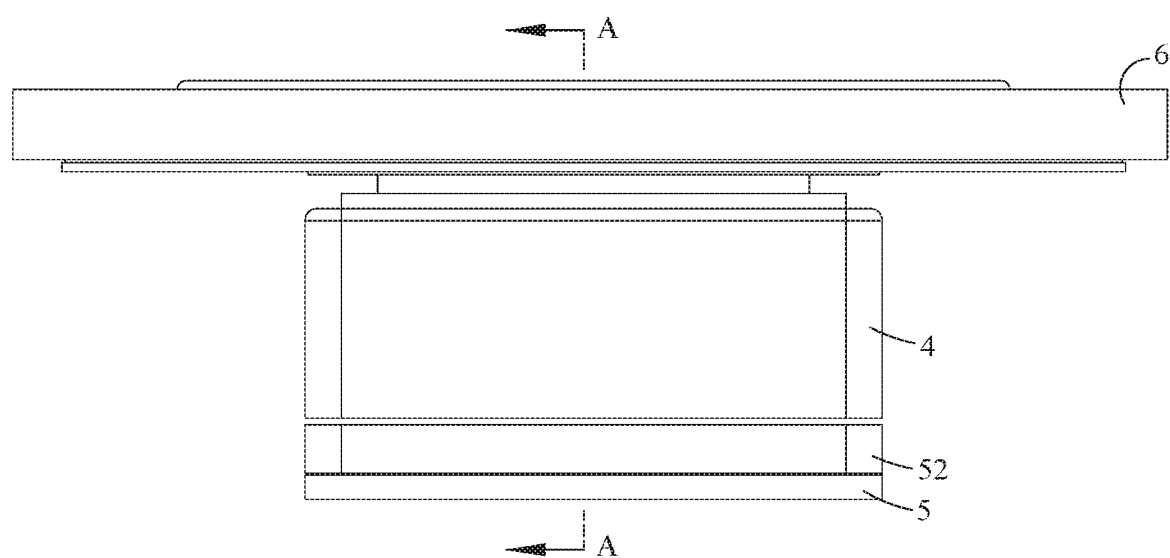
FIG. 1 is a schematic diagram of a structure of a lens module according to an embodiment of the present disclosure.
Figure 2:
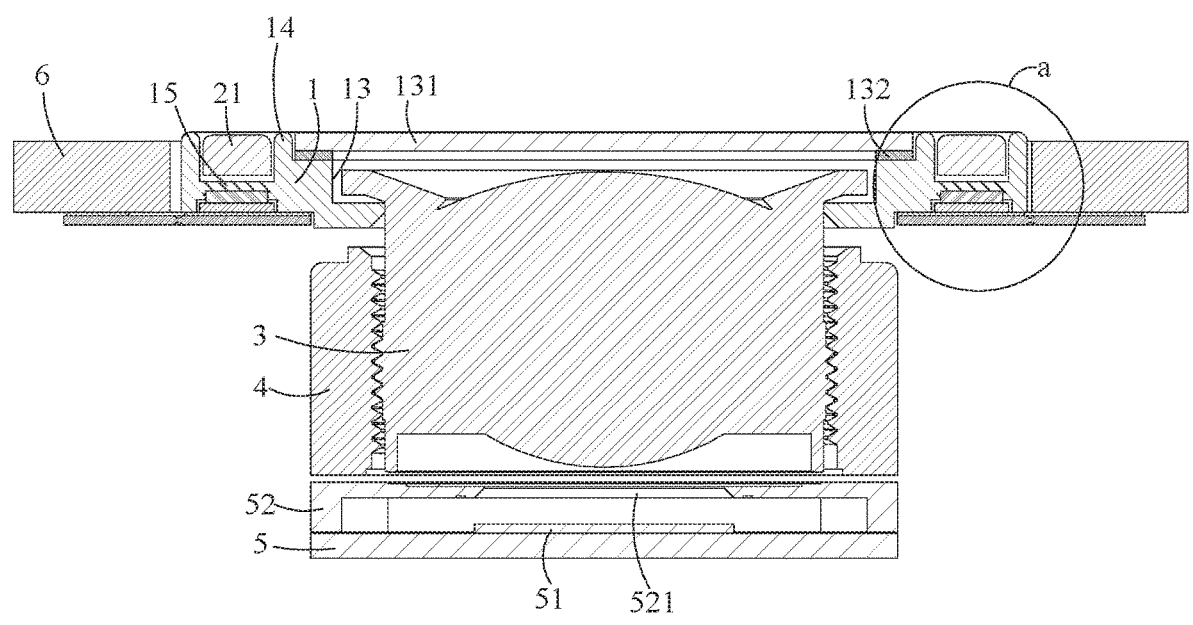
FIG. 2 is a cross-sectional view taken along A-A of FIG. 1.
Figure 3:
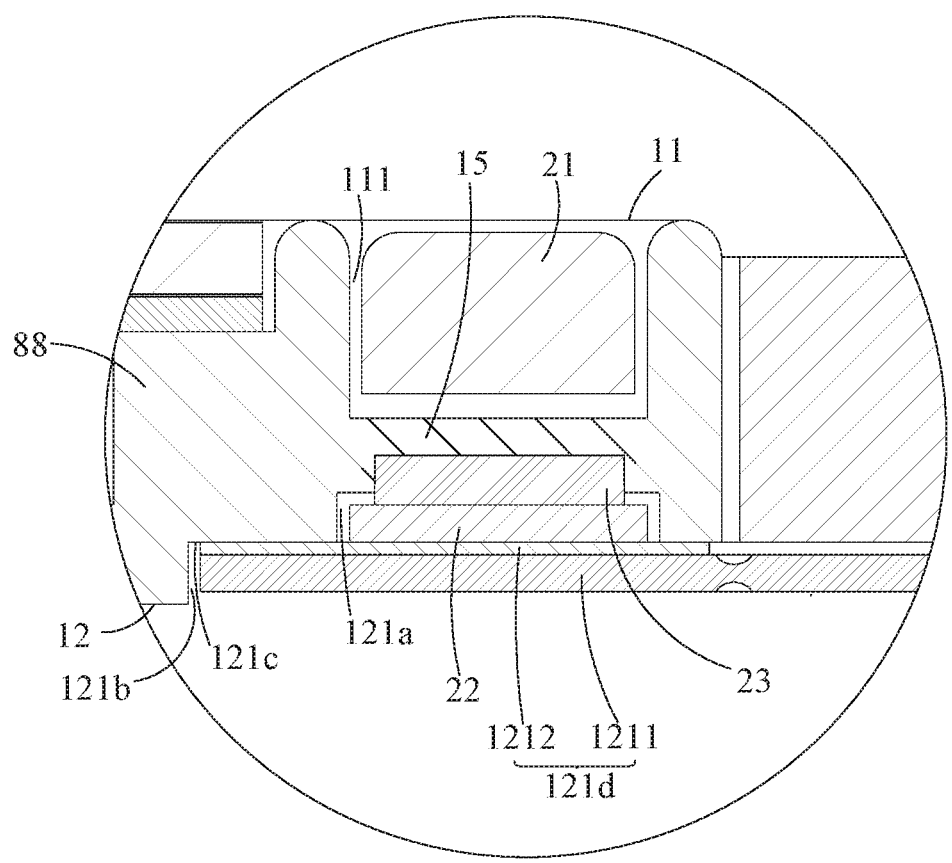
FIG. 3 is an enlarged view of a portion a shown in FIG. 2.
Figure 4:
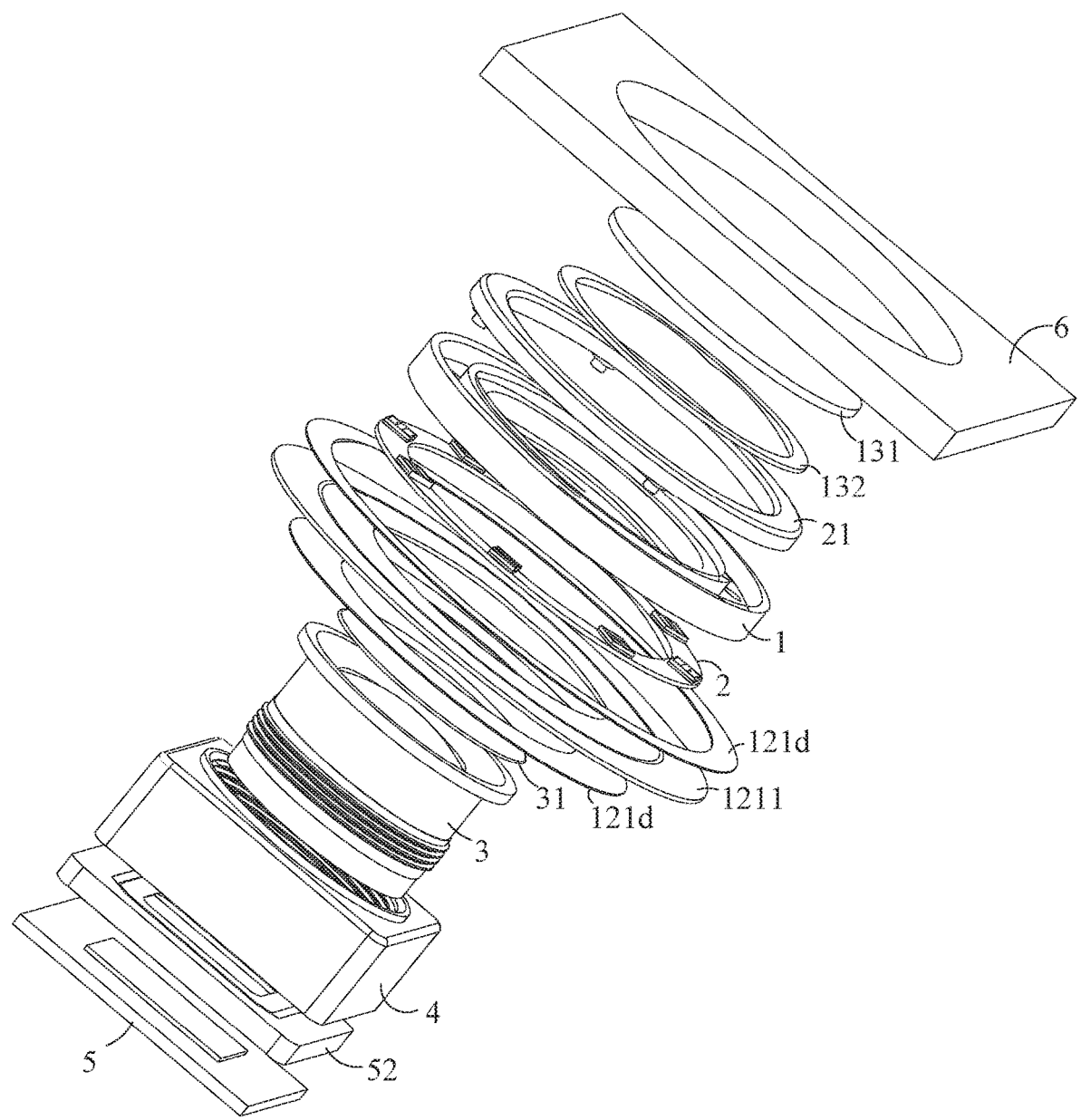
FIG. 4 is an exploded view of a lens module according to an embodiment of the present disclosure.
Figure 5:
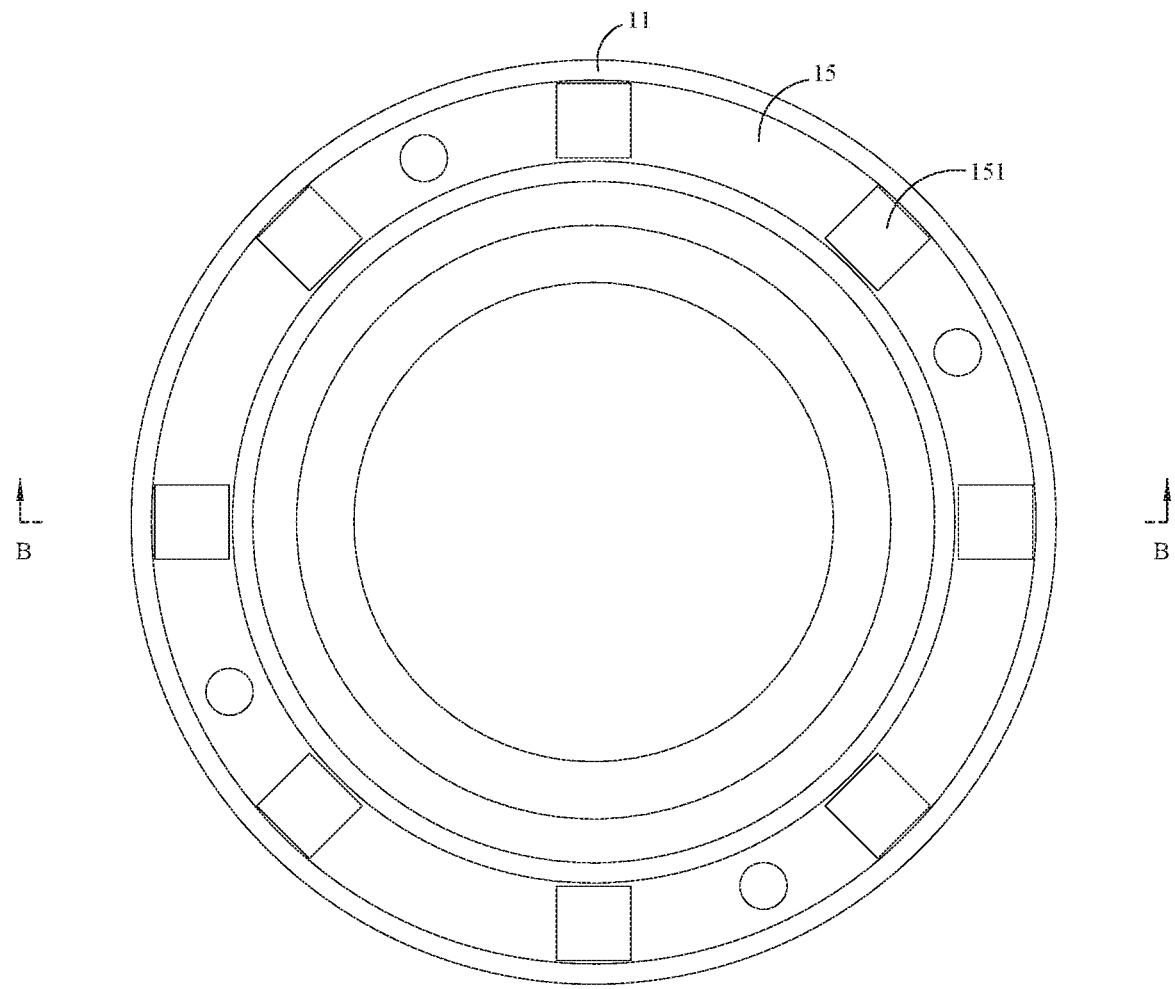
FIG. 5 is a schematic view of a structure of an illumination holder.
Figure 6:
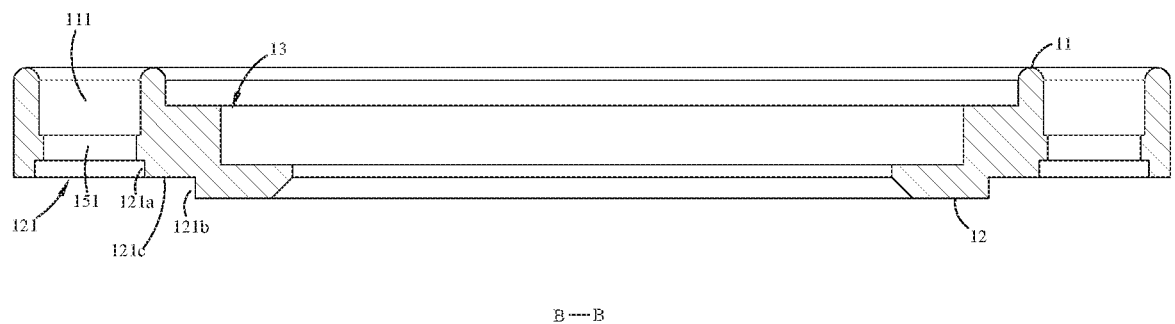
FIG. 6 is a cross-sectional view taken along B-B of FIG. 5.
Figure 7:
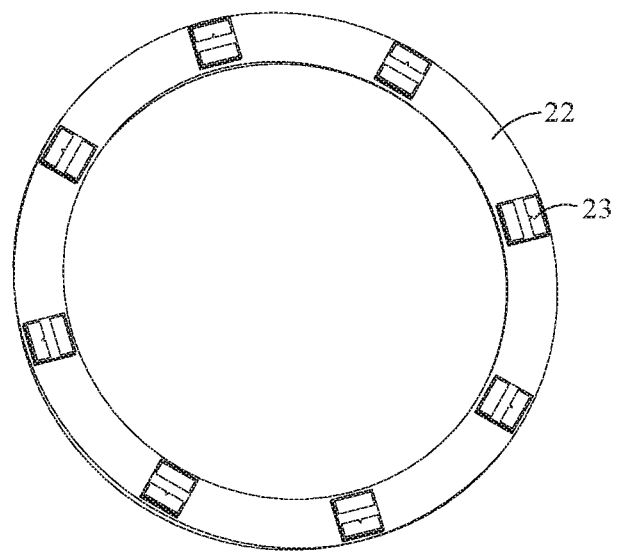
FIG. 7 is a schematic diagram of a structure of an illustration assembly according to an embodiment of the present disclosure.

FIG. 1 is a schematic diagram of a structure of a lens module according to an embodiment of the present disclosure. FIG. 2 is a cross-sectional view taken along A-A of FIG. 1. FIG. 3 is an enlarged view of a portion a shown in FIG. 2. FIG. 4 is an exploded view of a lens module according to an embodiment of the present disclosure. FIG. 5 is a schematic view of a structure of an illumination holder. FIG. 6 is a cross-sectional view taken along B-B of FIG. 5. FIG. 7 is a schematic diagram of a structure of an illustration assembly according to an embodiment of the present disclosure.

As shown in FIG. 1, FIG. 2 and FIG. 4, an embodiment of the present disclosure provides a lens module including a lens assembly and an illumination assembly 2 fixed to the lens assembly. The lens assembly includes a lens barrel 3 and a set of lenses received in the lens barrel 3. The illumination assembly 2 includes an illumination holder 1 that surrounds and is fixed to the lens barrel 3, and an illumination window 21 that is arranged on the illumination holder 1. The illumination window 21 has an annular shape and surrounds the lens assembly.

Since the illumination holder 1 surrounds the lens barrel 3 and the illumination window 21 is fixed to the illumination holder 1, the lens module is compact, and the illumination assembly 2 does not occupy an internal space of the electronic device. During assembly, it is only needed to fix the lens assembly without configuring an additional assembly space for the illumination assembly 2, thereby saving the assembly space and thus increasing a screen occupation ratio of the electronic device.

The lens assembly can be assembled in a cellphone, a tablet, a laptop, a navigation terminal or the like. The illumination assembly 2 surrounds the lens assembly in such a manner that light emitted from the illumination assembly 2 can evenly irradiate on a target to be imaged, thereby resulting in a clearer image taken by the lens assembly.

As shown in FIG. 2, FIG. 3, FIG. 4, FIG. 5 and FIG. 6, the illumination holder 1 includes a first end surface 11 and a second end surface 12. The first end surface 11 is provided with a first recess 111, and the second end surface 12 is provided with a second recess 121. The first recess 111 and the second recess 121 are respectively arranged at an upper position and a lower position that correspond to each other. The first recess 111 is located above the second recess 121. A connection portion 15 is provided between the first recess 111 and the second recess 121. The connection portion 15 is provided with a through hole 151, and light emitted from the illumination assembly 2 can irradiate on the target to be imaged via the through hole 151. The illumination window 21 is arranged in the first recess 111, and may be either fixed in the first recess 111 by adhesive or fixed to the first recess 111 in another proper manner.

As an example, there may be one through hole 151, two through holes 151, three through holes 151, or four through holes 151, and so on.

As an example, the through hole 151 and a light-emitting component in the illumination assembly 2 have same sizes, so that all light emitted from the light-emitting component 2 can pass through the through hole 151, thereby resulting in a clearer image taken by the lens assembly.

As an example, when more than one through hole 151 is provided, the through holes 151 are evenly spaced from each other in the connection portion 15, so that the light emitted from the light-emitting component can evenly pass through the through hole 151 to the target to be imaged.

The illumination holder 1 may have a square shape or a cylindrical shape, and may also have a substantially annular shape, as long as the illumination assembly 2 surrounds the illumination holder 1.

When the illumination holder 1 has a substantially annular shape, each of the first recess 111 and the second recess 121 has a substantially annular shape. The illumination window 21 is arranged in the first recess 111, and surrounds and is fixed to the illumination holder 1, so that the light emitted from the illumination assembly 2 can evenly irradiate on the target to be imaged, thereby resulting in a clearer image taken by the lens assembly. It should be noted that the "substantially annular shape" herein encompasses a complete annular shape, and also encompasses a discontinuous annular shape formed with a gap existing between adjacent bases due to a deviation in a forming or assembling process.

The illumination window 21 is arranged in the first recess 111 to prevent water or dust from entering the illumination assembly 2, and the light emitted from the illumination assembly 2 can irradiate on the target to be imaged via the illumination window 21. The illumination window 21 may be transparent or constructed and configured to selectively filter received light.

The illumination window 21 may be made of any material such as polycarbonate, acrylic, and the like. The illumination window 21 may be transparent or colored, and has a smooth or textured (e.g., frosted) surface along at least a portion of its inner or outer surface. The illumination window 21 has a constant thickness or a variable thicknesses.

The illumination window 21 can be fixed in the first recess 111 through an adhesive 1212, so that the illumination window 21 can be fixed firmly. The illumination assembly 2 can be sealed with the first recess 111 to prevent water or dust from entering the first recess 111, so as to achieve the better illumination effect.

In an embodiment, the illumination assembly 2 includes an illuminator, and the illuminator has an annular shape.

The illuminator has an annular shape, so that the light emitted from the illumination assembly can more evenly irradiate on the target to be imaged.

The illuminator may include a light source, an optical device that controls a direction of the light, necessary components for fixing and protecting a bulb and being connected to a power supply, components for decoration, adjustment and assembly, and the like. Here, the light source may be an LED or a laser diode.

In an embodiment, a plurality of LED lights 23 are provided, and the plurality of LED lights 23 are evenly distributed in the illumination window 21.

As shown in FIG. 7, the illumination assembly 2 includes a flexible substrate 22, and multiple LED lights 23 are arranged on the flexible substrate 22. The flexible substrate 22 has an annular shape, and the LED lights 23 are evenly spaced from each other on the flexible substrate 22. The flexible substrate 22 is arranged in a first recessed portion 121a. The LED lights 23 are arranged correspondingly to the through holes 151.

The LED lights 23 may include a first LED light and a second LED light having different color temperatures and distributed evenly and alternately. The first LED light and the second LED light may emit light independently or simultaneously.

As shown in FIG. 6, the second recess 121 includes a first recessed portion 121a and a second recessed portion 121b, and a step surface 121c is formed between the first recessed portion 121a and the second recessed portion 121b. The flexible substrate 22 is arranged in the first recessed portion 121a. The flexible substrate 22 may be fixed in the first recessed portion 121a by an adhesive, or the flexible substrate 22 may be fixed to the first recessed portion 121a in any other proper manner. When the flexible substrate 22 is fixed in the first recessed portion 121a by an adhesive, the flexible substrate 22 can be fixed firmly, and the flexible substrate 22 may also be sealingly connected to the first recessed portion 121a to prevent water or dust from entering the first recess 111 or the lens assembly from the first recessed portion 121a, thereby achieving the better illumination effect.

The second recessed portion 121b is provided with a first seal 121d, and the first seal 121d is arranged under the illumination assembly 2 and is attached to the step surface 121c to prevent water or dust from entering the first recessed portion 121a, thereby further preventing water or dust from entering the first recess 111 or the lens assembly from the first recessed portion 121a, which can achieve the better illumination effect.

As shown in FIG. 1 and FIG. 2, a module cover 6 covers the illumination holder 1, and the module cover 6 is fixed to the illumination holder 1. An upper surface of the first seal 121d is attached to the step surface 121c and is attached to a bottom surface of the module cover 6, so as to prevent water or dust from entering a gap between the module cover 6 and the illumination holder 1, thereby further preventing water or dust from entering the first recess 111 from the first recessed portion 121a.

Herein, the first seal 121d may be made of a rubber material and may be a rubber sealing ring, or may be made of any other proper material. When the first seal 121d is made of a rubber material, the first seal 121d may be attached to a bottom surface of the illumination assembly 2 and the step surface 121c by using an adhesive.

For example, the first seal 121d is a composite structure of a silica membrane 1211 and an adhesive 1212. The silica membrane 1211 is made of silicone rubber. The adhesive 1212 is made of an adhesive material, and two separate materials can be joined together by virtue of its adhesive property.

The second recessed portion 121b is provided with a first seal 121d, and the first seal 121d is arranged under the illumination assembly 2 and is attached and fixed to the step surface 121c. In this way, the first seal 121d can move together with the illumination holder 1 to prevent water or dust from entering the first recessed portion 121a, thereby further preventing water or dust from entering the first recess 111 or the lens assembly from the first recessed portion 121a.

In an embodiment, the illumination holder 1 further includes a step portion 13, and a blocking portion 14 is arranged between the step portion 13 and the first recess 111.

The illumination window 21 is completely isolated from the camera window 131, so as to prevent light leakage, i.e., to prevent the light emitted from the illumination assembly 2 from entering the lens assembly, which would otherwise result in an imaging defect.

When the illumination assembly 2 is turned on, the light emitted from the illumination assembly 2 is transmitted to the target to be imaged, and the blocking portion 14 blocks light from entering the lens assembly, thereby preventing the light from being transmitted to the lens in the lens assembly, which would otherwise affect transmittance of the lens. This can result in the clearer image taken by the lens assembly, thereby improving the user experience.

In an embodiment, the step portion 13 is provided with a camera window 131, and the camera window 131 is sealingly connected to the step portion 13 through a second seal 132.

Here, the second seal 132 may be made of rubber and may be a rubber sealing ring, or may be made of any other proper material.

For example, the second seal 132 is a composite structure of the silica membrane 1211 and the adhesive 1212. The silica membrane 1211 is made of silicone rubber. The adhesive 1212 is a made of an adhesive material, and two separate materials can be joined together by virtue of its adhesive property.

As an example, the second seal 132 is a window sealant. Here, the sealant is used to fill the gap, so as to serve as an adhesive for sealing. It has functions of anti-leakage, waterproof and dustproof.

In an embodiment, the lens barrel 3 and the illumination holder 1 are formed into one piece or adhered to each other. As shown in FIG. 2, the lens assembly includes a lens barrel 3, and the lens barrel 3 is fixed and connected to the step portion 13.

For example, the lens barrel 3 and the step portion 13 may be formed into one piece or adhered to each other. The lens barrel 3 is used to assemble the lens set. For example, the lens barrel 3 may have a square shape, a cylindrical shape or another shape.

When the lens barrel 3 is fixed and connected to the step portion 13, the lens barrel 3 may be received in the step portion 13, and the lens barrel 3 may be connected to the step portion 13 by thread or by welding, or the lens barrel 3 may be fixed to the step portion 13 by any other proper structure.

A third seal 31 may be provided between the lens barrel 3 and the step portion 13, so as to prevent water or dust from entering the lens barrel 3, thereby further preventing water or dust entering a light sensitive chip 51, which would otherwise lead to the poor imaging quality. In this way, the imaging quality can be improved.

Here, the third seal 31 may be made of rubber and may be a rubber sealing ring, or may be made of any other proper material.

In an embodiment, the lens assembly further includes a motor 4. The motor 4 is provided with internal threads, and the lens barrel 3 is provided with external threads, and the motor 4 is threaded to lens barrel 3.

Here, the motor 4 is used to carry the lens barrel 3 and can be stretched up and down to achieve a focusing function. The lens can be adjusted by the motor 4, so as to form a lens assembly with an adjustable focal length.

Here, the motor 4 can be electrically connected to a circuit, so that the motor 4 can drive the lens, thereby adjusting the lens assembly.

As shown in FIG. 2, the lens assembly further includes a circuit board 5. The circuit board 5 is arranged under the lens barrel 3, and a light sensitive chip 51 is provided on the circuit board 5. A cover plate 52 is arranged on the circuit board 5, and the cover plate 52 is provided with a light through hole 521. The cover plate 52 is fixed to the circuit board 5 and masks the light sensitive chip 51.

The light sensitive chip 51 is electrically connected to the circuit board 5 through a circuit. The light sensitive chip 51 is used to sense physical objects in the periphery, collect images, and transmit the collected information to a controller. The circuit board 5 provides a stable working environment for the light sensitive chip 51. The circuit board 5 may be a PCB hard board or a flexible circuit board 5, and the light sense device may be a charge coupled device (CCD) or a metal oxide semiconductor device (CMOS). The light sensitive chip 51 can be attached to the circuit board 5 by means of a surface attaching process.

A central axis of the light through hole 521 passes through the light sensitive chip 51 and is perpendicular to the light sensitive chip 51. A diameter of the light through hole 521 is smaller than a diameter of the lens. As an example, the light through hole 521 has a hole wall which is a smooth curved surface. As another example, the light through hole 521 has a hole wall which is a smooth cylindrical surface, which can facilitate stray light from the wall hole of the light through hole 521 entering the cover plate 52. For example, the light through hole 521 may be provided with a light filter.

The cover plate 52 may be made of a light-guide material to prevent stray light from being reflected into the light sensitive chip 51 through the hole wall of the light through hole 521, thereby leading to the clearer image and the better contrast. For example, the lens barrel 3 can be fixed to the cover plate 52.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A lens module, comprising:
   a lens assembly comprising a lens barrel and a set of lenses received in the lens barrel; and
   an illumination assembly fixed to the lens assembly, the illumination assembly comprising an illumination holder surrounding and fixed to the lens barrel and an illumination window arranged on the illumination holder,
   wherein the illumination window has an annular shape and surrounds the lens assembly;
   the illumination holder comprises a first end surface close to an object side and a second end surface opposite to the first end surface;
   the first end surface is provided with a first recess, the second end surface is provided with a second recess, the first recess and the second recess are arranged at an upper position and a lower position that correspond to each other, and a connection portion is provided between the first recess and the second recess;
   the connection portion is provided with at least one through hole; and
   the illumination window is arranged in the first recess.

2. The lens module as described in claim 1, wherein the illumination assembly further comprises a flexible substrate and at least one LED light arranged on the flexible substrate.

3. The lens module as described in claim 2, wherein the at least one LED light includes a plurality of LED lights, and the plurality of LED lights is evenly distributed in the illumination window.

4. The lens module as described in claim 3, wherein the lens assembly further comprises a circuit board arranged under the lens barrel;
   a light sensitive chip is provided on the circuit board; and
   a cover plate is arranged on the circuit board, the cover plate is provided with a light through hole, and the cover plate is fixed to the circuit board and covers the light sensitive chip.

5. The lens module as described in claim 2, wherein the second recess comprises a first recessed portion and a second recessed portion, and a step surface is formed between the first recessed portion and the second recessed portion;
   the flexible substrate is arranged in the first recessed portion, and the at least one LED light is arranged correspondingly to the at least one through hole; and
   the second recessed portion is provided with a first seal, and the first seal is attached to the step surface.

6. The lens module as described in claim 5, wherein the lens assembly further comprises a circuit board arranged under the lens barrel;
   a light sensitive chip is provided on the circuit board; and
   a cover plate is arranged on the circuit board, the cover plate is provided with a light through hole, and the cover plate is fixed to the circuit board and covers the light sensitive chip.

7. The lens module as described in claim 2, wherein the lens assembly further comprises a circuit board arranged under the lens barrel;
   a light sensitive chip is provided on the circuit board; and
   a cover plate is arranged on the circuit board, the cover plate is provided with a light through hole, and the cover plate is fixed to the circuit board and covers the light sensitive chip.

8. The lens module as described in claim 1, wherein the illumination holder further comprises a step portion, and a blocking portion is arranged between the step portion and the first recess.

9. The lens module as described in claim 8, wherein the step portion is provided with a camera window, and the camera window is sealingly connected to the step portion through a second seal.

10. The lens module as described in claim 9, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

11. The lens module as described in claim 8, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

12. The lens module as described in claim 1, wherein the lens barrel and the illumination holder are adhered to each other or formed into one piece.

13. The lens module as described in claim 12, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

14. The lens module as described in claim 1, wherein the lens assembly further comprises a motor, the motor is provided with internal threads, the lens barrel is provided with external threads, and the motor is threaded to the lens barrel.

15. The lens module as described in claim 14, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

16. The lens module as described in claim 1, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

17. The lens module as described in claim 1, wherein the lens assembly further comprises a circuit board arranged under the lens barrel;
    a light sensitive chip is provided on the circuit board; and
    a cover plate is arranged on the circuit board, the cover plate is provided with a light through hole, and the cover plate is fixed to the circuit board and covers the light sensitive chip.

\* \* \* \* \*